United States Patent
Rivoalen et al.

(10) Patent No.: US 12,041,308 B2
(45) Date of Patent: Jul. 16, 2024

(54) METHOD FOR MANAGING THE ACCESS TO A MULTIMEDIA CONTENT

(71) Applicant: Orange, Issy-les-Moulineaux (FR)

(72) Inventors: Mathieu Rivoalen, Chatillon (FR); Hervé Marchand, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/990,071

(22) Filed: Nov. 18, 2022

(65) Prior Publication Data
US 2023/0164392 A1 May 25, 2023

(30) Foreign Application Priority Data
Nov. 23, 2021 (FR) .................. 2112372

(51) Int. Cl.
*H04N 21/462* (2011.01)
*H04N 21/647* (2011.01)

(52) U.S. Cl.
CPC ....... *H04N 21/4622* (2013.01); *H04N 21/647* (2013.01)

(58) Field of Classification Search
CPC .................. H04N 21/4622; H04N 21/647
USPC .......................................... 725/110
See application file for complete search history.

(56) References Cited

U.S. PATENT DOCUMENTS 7,472,197 B2 * 12/2008 Li ................... H04L 65/1101
725/62
2005/0160465 A1 7/2005 Walker
2009/0064225 A1 * 3/2009 Lee ................ H04N 21/42653
725/39
2016/0100213 A1 * 4/2016 Song ................... H04N 21/84
725/54
2016/0314794 A1 10/2016 Leitman et al.

FOREIGN PATENT DOCUMENTS

GB 2496208 A 5/2013

OTHER PUBLICATIONS

French Search Report and Written Opinion dated Jun. 22, 2022 for corresponding French Application No. 2112372, filed Nov. 23, 2021.

* cited by examiner

*Primary Examiner* — Nnenna N Ekpo
(74) *Attorney, Agent, or Firm* — David D. Brush; Westman, Champlin & Koehler, P.A.

(57) ABSTRACT

A method for managing the access, by a player/reader device, to a multimedia content accessible from a source, called main source, from which broadcast of the content has begun. A change of the play/read time, during the playing/reading, is able to trigger a playing/reading from a first source selected by default and offering a first rendering quality. The method includes: receiving a request for access to the content being broadcast; obtaining a set of data sources, called secondary sources, from which the content is accessible; receiving, during the playing/reading, a command for moving the play/read time; and selecting a source depending on the first rendering quality and on the second rendering quality.

9 Claims, 2 Drawing Sheets

[Fig. 1]
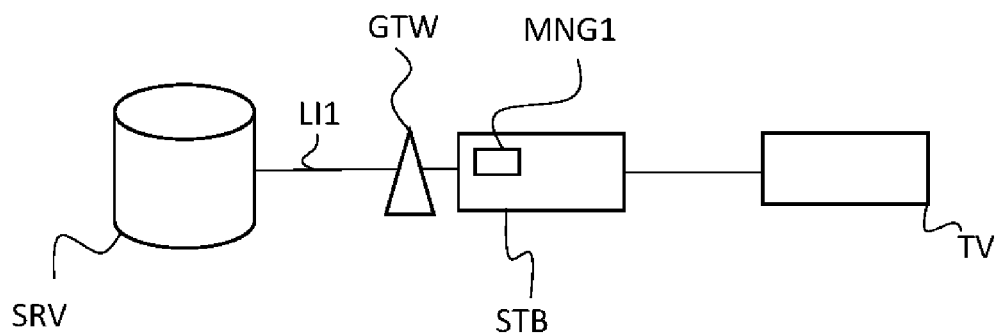
[Fig. 2]
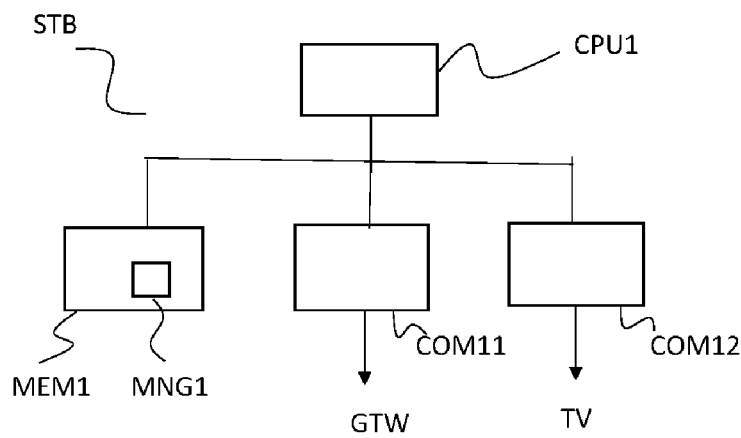

[Fig. 3]
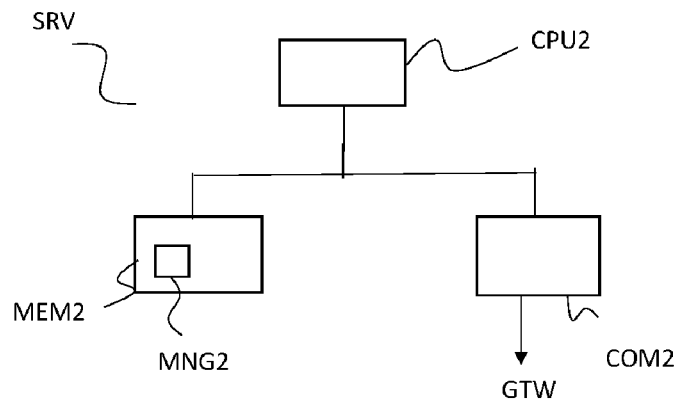
[Fig. 4]
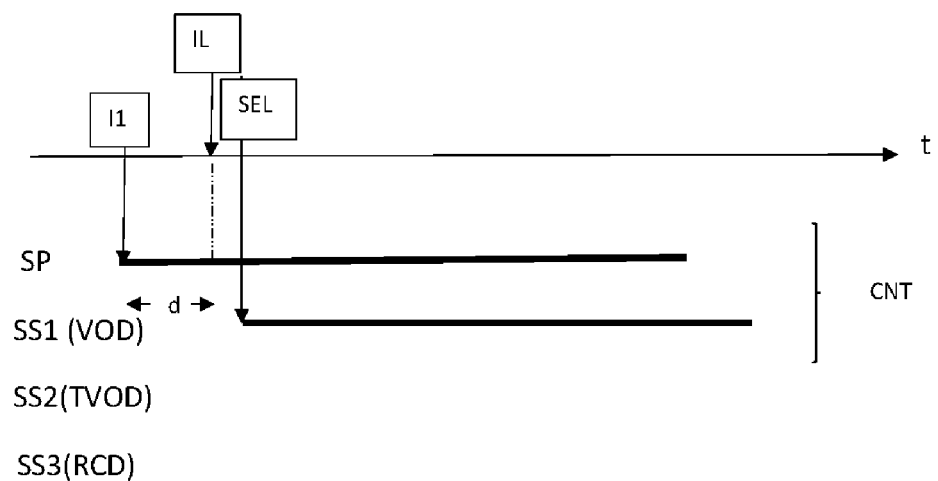

METHOD FOR MANAGING THE ACCESS TO A MULTIMEDIA CONTENT

TECHNICAL FIELD

The field of the invention is that of digital multimedia contents, namely digital audio and/or video contents, also called audiovisual contents.

The invention relates more especially to a method for managing the access to a multimedia content.

A player/reader device targets any devices able to receive multimedia streams for example a decoder, a mobile telephone, a tablet, etc.

The content targeted here is a content having a programmed broadcast time. Such a content is for example a content broadcast in real time, also called "live" content, by a television channel.

BACKGROUND

It sometimes happens that the start of a televised program (movie, series, etc.) has been missed. A function, referred to as "Start Over" or "Restart" or "catch-up" by those skilled in the art, allows a program being broadcast to be restarted, at any time, from its beginning. For example, if a movie starts at 8:50 pm on a broadcast channel (television channel) and a user switches to this television channel at 9:17 pm, he/she can engage the "restart" function in order to be able to play/read the content from its beginning.

Generally speaking, the broadcast of live contents relies on a broadcast technology in multi-broadcast mode (also called "multipoint" broadcast or "group broadcast" or else "Multicast" by those skilled in the art). This technology allows a great deal of bandwidth to be economized in the network of an operator who manages the broadcast because the content is reproduced as close as possible to the player/reader device. On the other hand, when a player/reader device requests the use of the "start over" function, an access to the requested content triggers an automatic switching of the multicast technology to a technology for broadcast of content in point-to-point mode (unicast). The consumption of bandwidth in the network of the operator therefore increases considerably owing to the transmission in point-to-point mode between the content server and all of the player/reader devices having requested a use of the "start over" function; for example, when the requested content is a content with a large audience, the number of connections in point-to-point mode can become enormous and lead to a bottleneck phenomenon in the bandwidth, which is detrimental to the performance of the network. Moreover, the contents transmitted in point-to-point mode generally have a poorer quality than when they are broadcast in multicast mode. The quality of the image is then not as good as during the broadcast of the content live. The user experience is then degraded.

One or more aspects of the present disclosure offer a solution not having the drawbacks of the prior art.

SUMMARY

For this purpose, a first functional aspect relates to a method for managing the access, by a player/reader device, to a multimedia content accessible from a source, called main source, from which the broadcast of the content has started, a change of the play/read time, during the playing/reading, being able to trigger a playing/reading from a first source selected by default and offering a first rendering quality, the method comprising a) A step for receiving a request for access to said content being broadcast;
b) A step for obtaining a set of data sources, called secondary sources, from which the content is accessible;
c) A step for receiving, during the playing/reading, a command for moving the play/read time;
d) A step for selecting a source depending on the first rendering quality and on the second rendering quality.

According to an exemplary aspect of the present disclosure, when a content is being broadcast from a main data source, for example a program or movie broadcast over a television channel, and when a request for restarting the content is received by the player/reader device, the management entity searches for all the data sources able to supply this same content. Once the data sources are available, the entity selects a source, main source or secondary source, in order to proceed with the playing/reading depending on the first and on the second rendering quality. Once the source has been selected, the player/reader device requests an access to the content from the selected source.

By virtue of an exemplary aspect of the present disclosure, an activation of the restart function offers a possible access to the same content, from the start or at a later time, via distinct data sources offering an access to the same content.

According to a first embodiment, the secondary source is selected if the second rendering quality is at least equal to the first rendering quality. This embodiment ensures that, when the content is played, the rendering will be of a rendering quality at least higher than the first quality associated with the main source selected by default.

According to a second embodiment, the step for obtaining sources is followed by a step for requesting selectable identifiers representative of the secondary data sources. In certain cases to be rendered, for example in the case of adaptative streaming, several image qualities (coding rates) are available for the same content. According to one variant of the first embodiment, when several qualities are available for the same content, all or part of the available image qualities are rendered and selectable. This variant affords the possibility of selecting a given rendering quality from amongst the qualities offered. A choice of quality may therefore be made depending on the requirements; for example, if the player/reader device disposes of a small screen, a low quality selection will be sufficient; conversely, if it has a large screen, a suitable quality will be selected accordingly.

According to one sub-variant, only the contents having a rendering quality higher than or equal to the content being rendered are offered for the selection. This sub-variant is advantageous because it offers not only a restart but also the possibility of a list of contents filtered according to their rendering qualities. This sub-variant guarantees that the content selected will in any case have a quality at least equal to the content being broadcast. The user experience is excellent.

According to a third embodiment, which could be implemented alternatively or cumulatively with the preceding embodiment, a secondary source is a broadcast channel supplying the content on demand. In this second embodiment, the selected content may be rendered from its start. A user accesses the content with a delay with respect to the main content being rendered but accesses the latter from its start.

According to a third embodiment, which could be implemented alternatively or cumulatively with the preceding embodiments, a secondary source is a television channel for which the time of broadcast of the content is yet to come. In this second embodiment, the rendering of the content requires a wait time but also, just like the second embodiment, allows the content to be seen from its start.

According to a fourth embodiment, which could be implemented alternatively or cumulatively with the preceding embodiments, the selected source is the source whose time to access the content is the shortest. This fourth embodiment guarantees an access to the requested content that is the fastest possible. For example, if all of the data sources obtained include at the same time sources able to supply content on demand and sources able to supply contents in real time, the selected source is automatically the broadcast channel supplying the content on demand. The receipt of the content will probably be faster.

A first hardware aspect of the present disclosure relates to an entity for managing the access, by a player/reader device, to a multimedia content accessible from a source, called main source, from which the broadcast of the content has begun, characterized in that it comprises A module for receiving a request for access to said content being broadcast;

A module for obtaining a set of data sources, called secondary sources, from which the content is accessible;

A module for receiving, during the playing/reading, a command for moving the play/read time;

A module for selecting a source according to the first rendering quality and to the second rendering quality.

A second hardware aspect relates to a player/reader device comprising a management entity such as defined hereinabove.

A third hardware aspect relates to a computer program able to be implemented on an entity such as defined hereinabove, the program comprising code instructions which, when executed by a processor, implement the steps of the selection method defined hereinabove.

Lastly, a fourth hardware aspect relates to a first data medium on which at least one series of program code instructions has been stored for the execution of a management method such as defined in conjunction with the second functional aspect.

Such a recording medium may be any given entity or device capable of storing the program. For example, the medium may comprise a storage means, such as a ROM, for example a CD ROM or a microelectronic circuit ROM, or else a magnetic recording means, for example a USB memory stick or a hard disk.

On the other hand, such a recording medium may be a transmissible medium such as an electrical or optical signal, which may be carried via an electrical or optical cable, by radio or by other means, so that the computer program that it contains may be executed remotely. The program according may in particular be downloaded over a network for example the Internet.

Alternatively, the recording medium may be an integrated circuit into which the program is incorporated, the circuit being designed to execute or to be used in the execution of the aforementioned display control method.

BRIEF DESCRIPTION OF THE DRAWINGS

One or more aspects of the present disclosure will be better understood upon reading the description that follows, given by way of example and with reference to the appended drawings in which:

FIG. 1 shows a data processing system on which one exemplary embodiment is illustrated.

FIG. 2 is a simplified schematic diagram of the hardware structure of the player/reader device;

FIG. 3 is a simplified schematic diagram of the hardware structure of the server;

FIG. 4 illustrates several channels for broadcasting the same content with distinct broadcast times spread out over time.

DETAILED DESCRIPTION OF ONE EXEMPLARY EMBODIMENT OF THE PRESENT DISCLOSURE

FIG. 1 shows a data processing system in which a content distribution network, called CDN by those skilled in the art, is implemented from which contents are transmitted to client devices or devices for playing/reading contents.

In the present example, the system comprises a single player/reader device. However, the present disclosure is applicable to any number of player/reader devices.

The player/reader device is for example an STB decoder.

The multimedia content targeted here is a video content corresponding to a television channel over which televised programs are broadcast having a start time corresponding to a programmed broadcast time and an end time.

A "start over" function is provided in order to see a content from its start when the latter has already started.

The data processing system comprises a device for playing/reading an STB multimedia stream, for example a decoder connected to a TV rendering terminal such as a television.

In the present example, the STB player/reader device is connected to a port of the TV rendering device; the player/reader device and the TV rendering device could also constitute one and the same device.

In the present example, the player/reader device STB is situated within a local network LAN managed by a home gateway GTW. The context of the local network is given by way of example and could be readily transposed to an Internet network of the "best effort" type, a company network, etc.

The gateway GTW is able to communicate via a telecommunications network LI1 such as a wide area network WAN known to those skilled in the art.

The CDN consists of servers connected in a network within the wide area network;

these servers cooperate in order to make multimedia contents available to users. In order to simplify the description of an exemplary aspect of the present disclosure, a single content server SRV will be shown in FIG. 1 to represent the CDN.

The content server SRV is situated, in the present example, within the wide area network WAN. The server SRV dispose of several sources of multimedia contents.

The content server SRV receives, for example, digital television content channels coming from a broadcast television network (not shown), and makes them available to client terminals, here the player/reader device STB.

The content server SRV also makes available contents of the type on-demand video, on-demand television, or any other contents, for example stored in a recorder installed in the player/reader device, whose transmission is not programmed like for the television.

The contents CNT are made available in a given format. Such a content CNT is, for example, a content downloaded in adaptive streaming mode. The standard MPEG-DASH (for "Dynamic Adaptive Streaming over HTTP") is an audiovisual broadcast format standard over Internet; this standard is based on the preparation of the content in various representations with variable quality and data rate, divided up into segments of short duration (of the order of a few seconds), also called "chunks" by those skilled in the art. Each of these segments is made available individually by means of an exchange protocol between the rendering terminal and the server supplier of multimedia contents. The protocol mainly targeted is the HTTP protocol, but other protocols (for example FTP) may also be used. The organization of the segments and the associated parameters are published in a description file in the XML format. No more details of this download mode are given here because it is not relevant for the description of the present disclosure.

FIG. 2 shows an architecture of a player/reader device STB. This device STB comprises, conventionally, memories MEM1 associated with a processor CPU1. The memories may be of the ROM ("Read Only Memory") or RAM ("Random Access Memory") or else Flash type.

The decoder STB may transmit a content to be rendered to a TV rendering device via a communication module COM12. This module COM12 is for example an HDMI link.

The decoder STB communicates with the gateway via an Ethernet module for a local wired communication or via a radio module of the Wi-Fi type for a local wireless communication with the residential gateway GTW. The module in question is referenced COM11 in FIG. 2.

The decoder STB comprises an entity for downloading in streaming mode (not shown) able to manage the downloading of segments. The decoder STB also comprises a management entity MNG1, called first management entity in the following part, whose function will be described hereinbelow.

With reference to FIG. 3, the server SRV is also equipped with at least one processor CPU2 and with memories MEM2 in order to carry out data processing. The server is also equipped with a management entity MNG2, called second entity, able to manage the transmission of a content from the server SRV to one or more player/reader devices. The server SRV communicates with the gateway GTW via a WAN network in order to communicate with the residential gateway GTW. The module in question is referenced COM2 in FIG. 3.

A multimedia content CNT is accessible from a source SP, called main source, from which the broadcast of the content has begun. A change of the play/read time, during the playing/reading, is able to trigger a playing/reading from a first source selected by default and offering a first rendering quality. The first source is for example a data source able to supply a content in unicast mode.

According to an exemplary aspect of the present disclosure, the first entity, the management entity MNG1, upon detection of a selection of a main content, the broadcast of which has started a certain time ago, carries out the following steps:
 a) A step for receiving a request for access to said content being broadcast;
 b) A step for obtaining a set of data sources SS1(VOD)/SS2(TVOD)/SS3(RCD), called secondary sources, from which the content is accessible;
 c) A step for receiving, during the playing/reading, a command for moving the play/read time;
 d) A step for selecting the source depending on the first rendering quality and on the second rendering quality.

The processor CPU1 of the entity MNG1 is responsible for the execution of the preceding steps.

The second entity MNG2, for its part, carries out a step for receiving the request for access and for transmitting the requested content from the requested source.

It should be noted that the step a) may be carried out prior to receiving the selection of the main content.

In the present example, with reference to FIG. 4, a televised content is scheduled to be broadcast over a main source such as television channel. The television channel and the associated broadcast time I1 is that scheduled by default in a service plan of a content provider. This time can generally be seen via a program guide in which all of the televised contents and the respective broadcast times appear. The program guide is generally accessible on demand and displayed via a graphical interface on a screen.

According to an exemplary aspect of the present disclosure, when a television channel is selected at a time IL, later than the time I1 defined hereinabove, and therefore when a televised program is being broadcast over this television channel, and when the "restart" (start over) function is activated, the first entity MNG1 triggers a search for data sources, called secondary data sources, over which the content is accessible. The content may indeed be scheduled to be broadcast, or already being broadcast, over another television channel, or more probably available over a channel of the VOD (acronym for Video On Demand) or TVOD (acronym for Transactional Video On Demand) type, or else on a recorder.

It should be noted that this search step may be carried out prior to the selection of a television channel.

For this purpose, after execution by the processor CPU1, the first management entity MNG1 installed in the player/reader device STB will access the information relating to the service plan offered by the server SRV and search for all the secondary data sources capable of providing the requested content.

It is recalled here that the service plan provides all the parameters needed to subscribe to or unsubscribe from a multicast stream, notably the IP address and the software port for accessing this multicast stream.

It assumed that the first management entity MNG1 identifies three secondary data sources SS1-SS3 able to provide the desired content.

Taking one example of a content CNT, for example a movie, the official broadcast of which is programmed over the main channel SS1 on a Saturday evening at 8:00 pm (I1=8:00 pm).

The decoder STB receives, in a first step, a request for access to the content CNT via the selected television channel representative of the main data source. With reference to FIG. 4, it is assumed that the request for access to the content is received at a time IL, for example at 8:11 pm (IL=8:11 pm).

At this stage, at this time IL, it is understood that the requested content CNT has already being broadcast for a duration "d" and therefore that the user has missed the start (a continuous vertical line illustrates the rendering of the VOD content). The first entity MNG1 receives this request for access to the content.

The access request may come from an access command from a remote control able to remotely control the decoder STB.

It is assumed that the function "restart" is activated.

It is assumed that the first entity MNG1 finds several secondary data sources SS1(VOD)/SS2(TVOD)/SS3(RCD) able to provide the requested content, respectively. SS2 (TVOD) is for example a platform providing contents on demand TVOD and SS3(RCD) is for example a recorder.

In the present example, the management entity MNG1 requests a display of the various data sources SS1(VOD)/SS2(TVOD)/SS3(RCD) on the screen and allows a selection of one of the sources from the remote control.

Here, it is assumed that the secondary data source SS1 (VOD) is selected.

After receiving the selection of the secondary data source, the management entity MNG1 requests SEL an access to the content from the secondary data source SS1(VOD).

For this purpose, the entity executes the associated VOD service so as to access the VOD content.

At this stage, playing/reading of the VOD content may be started (a continuous vertical line illustrates the rendering of the VOD content).

It is observed here that, although the broadcast has been running for a duration "d" over the main channel associated with the main data source, the access to a secondary source of the VOD type allows the content to be played/read from the start. The resulting effect is the same as a play/read request as if the access had been gained at I1=8:00 pm. As a bonus, the access to a secondary source may also, in some cases, allow an access to a content of better quality than the quality of the content broadcast over the main channel. Indeed, most of the time the VOD contents are often available in several formats (HD, UHD, 4K, etc.); the selection may then be made appropriately depending on the desired quality. It is recalled here that the quality is dependent on the coding rate used for coding the video stream.

An exemplary aspect of the present disclosure therefore allows a given format to be selected as a function for example of the size and of the resolution of the screen of the rendering device. This is all the more advantageous when the player/reader device used allows the content to be received and rendered in a better quality than that broadcast over the live stream. In this case, the player/reader device offers the playing/reading of this content to the user with a higher quality.

The first management entity MNG1 may also not offer all the secondary sources found or all the image qualities available. The management entity MNG1 may filter secondary sources or even image qualities offered. The filter may be based on several parameters such as the environment of the network of the player/reader device (fiber/ADSL/etc.), the capacity of the player/reader device to decode the content in a quality higher than that broadcast from the main source, etc.

According to one variant, the selected source is the source whose time to access the content is the shortest.

For example, when the set of secondary sources comprises a channel which offers contents on demand and a recorder, the recorder will be automatically selected because it is the fastest to provide the content.

For example, when the set of secondary sources comprises both a broadcast channel providing the content on demand and a channel broadcast in real time, the selected source is automatically a broadcast channel providing the content on demand. Indeed, selecting a content broadcast in real time would imply receiving either a content whose broadcast has begun, or a content whose broadcast is yet to come. The probability of receiving the content from its start, when the read request is received at the time IL, is low. Conversely, a content on demand allows it to be received with a reduced wait time; the wait time would be limited to the time for processing of the request for access to the content by the processor CPU1, for the sending of a request and for the receipt of the content to be rendered.

According to one variant, a secondary source is selected if the second rendering quality associated with this secondary source is at least equal to the first rendering quality which, in the present example, is associated with the unicast source.

It should finally be pointed out that the first management entity MNG1 is equipped with the following modules for the implementation of an exemplary aspect of the present disclosure:

a. A receiver module able to receive a request for access to said content being broadcast;
b. A module for obtaining sources able to obtain a set of data sources, called secondary sources, from which the content is accessible;
c. A module for receiving, during the playing/reading, a command for moving the play/read time;
d. A module for selecting the source depending on the first rendering quality and on the second rendering quality.

It should lastly here be pointed out that the term module or the term entity may correspond both to a software component and to a hardware component or a set of hardware and software components, a software component itself corresponding to one or more computer programs or subprograms or, more generally, to any element of a program able to implement a function or a set of functions such as described for the modules in question. In the same way, a hardware component corresponds to any element of a hardware assembly able to implement a function or a set of functions for the module in question (integrated circuit, smartcard, memory card, etc.).

Although the present disclosure has been described with reference to one or more examples, workers skilled in the art will recognize that changes may be made in form and detail without departing from the scope of the disclosure and/or the appended claims.

The invention claimed is:

1. A method comprising:
managing access, by a player/reader device, to a multimedia content accessible from a source, called main source, from which a broadcast of the content has begun, a change of a play/read time, during playing/reading, being able to trigger a playing/reading from a first source selected by default and offering a first rendering quality, the managing being performed by an entity device and comprising:
a. receiving a request for access to said content being broadcast;
b. obtaining a set of data sources, called secondary sources, from which the content is accessible, a secondary source of the set of data sources offering a second rendering quality;
c. receiving, during the playing/reading, a command for restarting the content from a beginning of the content;
d. selecting a source depending on the first rendering quality, the second rendering quality and an ability to restart the reading from the beginning; and
e. reading the content from the selected source from the beginning of the content.

2. The method as claimed in claim 1, wherein the secondary source is selected if the second rendering quality is at least equal to the first rendering quality.

3. The method as claimed in claim 1, wherein the obtaining sources is followed by requesting selectable identifiers representative of the secondary data sources to be rendered.

4. The method as claimed in claim 3, wherein, when several qualities are available for the same content, all or part of the available image qualities are rendered and selectable.

5. The method as claimed in claim 4, wherein only the contents having a rendering quality greater than or equal to the content being rendered are offered for the selection.

6. The method as claimed in claim 1, wherein a secondary source is a broadcast channel providing the content on demand.

7. The method as claimed in claim 1, wherein the selected source is the source whose time to access the content is the shortest.

8. An entity device comprising:
a processor; and
a non-transitory computer readable medium comprising instructions stored thereon which when executed configure the entity to implement a method of managing access, by a player/reader device, to a multimedia content accessible from a source, called main source, from which broadcast of the content has begun, a change of a play/read time, during playing/reading, being able to trigger a playing/reading from a first source selected by default and offering a first rendering quality, wherein the managing comprises:
a. receiving a request for access to said content being broadcast;
b. obtaining sources able to obtain a set of data sources, called secondary sources, from which the content is accessible, a secondary source of the set of data sources offering a second rendering quality;
c. receiving, during the playing/reading, a command for restarting the content from a beginning of the content;
d. selecting a source depending on the first rendering quality, the second rendering quality and an ability to restart the reading from the beginning; and
e. reading the content from the selected source from the beginning of the content.

9. A non-transitory computer readable medium comprising a computer program stored thereon, the program comprising code instructions which, when executed by a processor of a management entity, perform a method comprising:
managing access, by a player/reader device, to a multimedia content accessible from a source, called main source, from which the broadcast of the content has begun, a change of a play/read time, during playing/reading, being able to trigger a playing/reading from a first source selected by default and offering a first rendering quality, the managing being performed by an entity device and comprising:
receiving a request for access to said content being broadcast;
obtaining a set of data sources, called secondary sources, from which the content is accessible, a secondary source of the set of data sources offering a second rendering quality;
receiving, during the playing/reading, a command for restarting the content from a beginning of the content;
selecting a source depending on the first rendering quality, the second rendering quality and an ability to restart the reading from the beginning; and
reading the content from the selected source from the beginning of the content.

\* \* \* \* \*